United States Patent [19]

Flaugh

[11] 4,316,617
[45] Feb. 23, 1982

[54] VEHICLE TOWING APPARATUS

[76] Inventor: Ronald C. Flaugh, 407 N. Main St., Churubusco, Ind. 46725

[21] Appl. No.: 184,934

[22] Filed: Sep. 8, 1980

[51] Int. Cl.³ .............................................. B60D 1/14
[52] U.S. Cl. ................................ 280/402; 280/490 R; 280/491 R; 414/563
[58] Field of Search ............... 280/402, 479 R, 479 A, 280/491 R, 490 R, 478 R; 414/563

[56] References Cited

U.S. PATENT DOCUMENTS

| | | | |
|---|---|---|---|
| 3,664,687 | 5/1972 | Nutt et al. | 280/491 |
| 3,738,684 | 6/1973 | Lusk | 280/491 R |
| 3,897,085 | 7/1975 | Hawkins | 280/402 |
| 4,113,272 | 9/1978 | Sebby | 280/402 |
| 4,149,643 | 4/1979 | Skala | 414/563 |

Primary Examiner—Joseph F. Peters, Jr.
Assistant Examiner—Donn McGiehan
Attorney, Agent, or Firm—Gust, Irish, Jeffers & Hoffman

[57] ABSTRACT

Vehicle towing apparatus comprises a supporting frame adapted to be mounted on the rear and top of a passenger car. The frame includes an upstanding support having a horizontal cross member and an upright slot which opens through the cross member. An elongated boom is disposed in registry with the slot. The boom is carried for longitudinal movement on the cross member for only a portion of its length, a pair of side rails on the boom directly supporting it from the cross member. The frame further includes a guide device spaced from the upstanding support which is mounted on the top of the passenger car. The guide device receives the boom for longitudinal sliding movement and also for swinging movement about a pivot pin in the guide device. An adjustable pin is carried by the upstanding support for spanning the slot and for carrying the boom when it is extended to a position which disengages the boom-supporting rails from the cross member. The distal end of the boom is adapted to be connected to the fifth wheel of a tractor. By connecting the cable of a winch mounted on the rear frame of the passenger car to the boom overhead, the winch may be operated for lifting the rear wheels of the passenger car off the ground. The tractor may then be driven for towing the passenger car.

9 Claims, 8 Drawing Figures

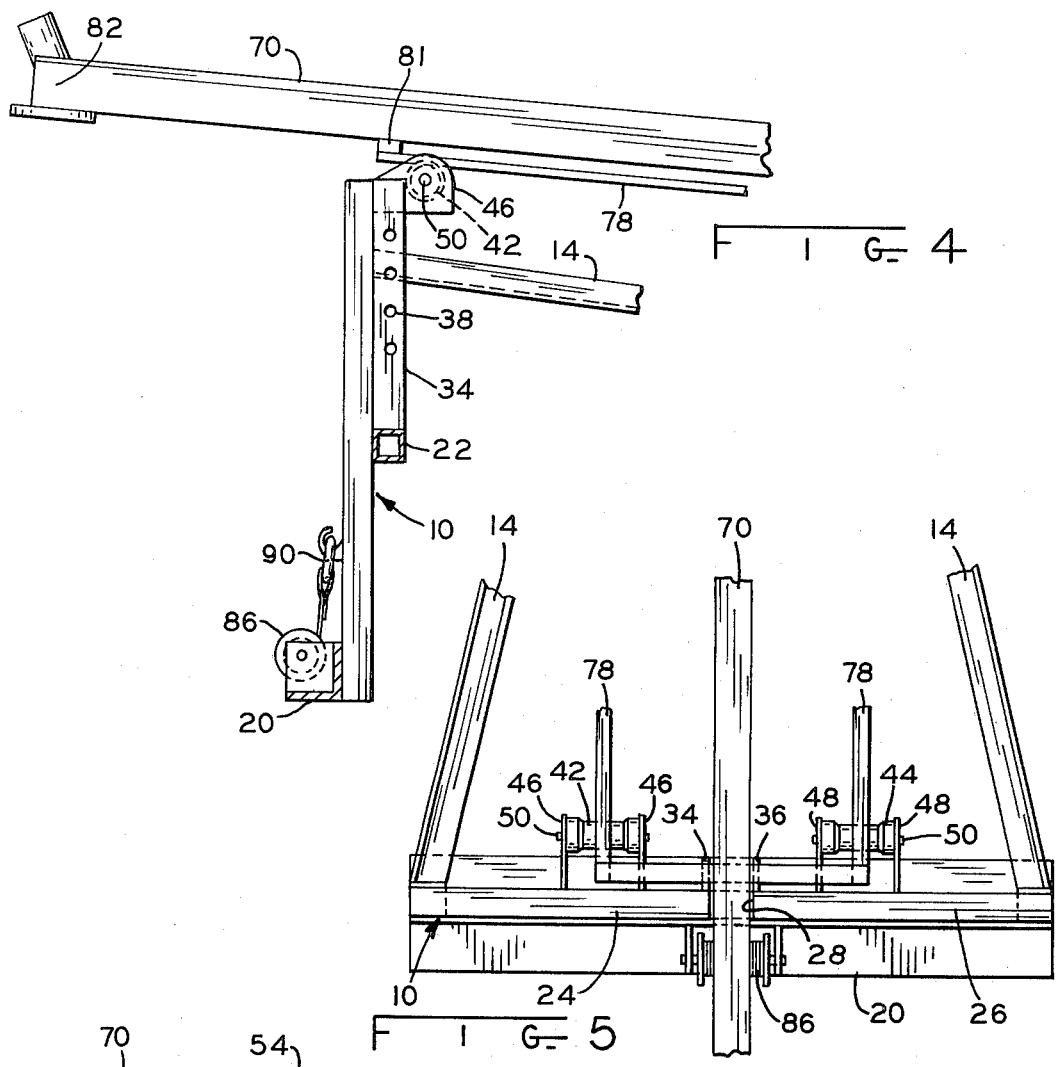
FIG. 4
FIG. 5
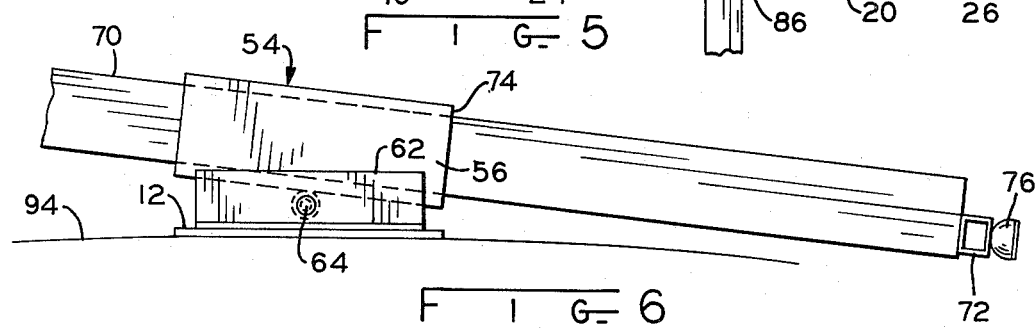
FIG. 6
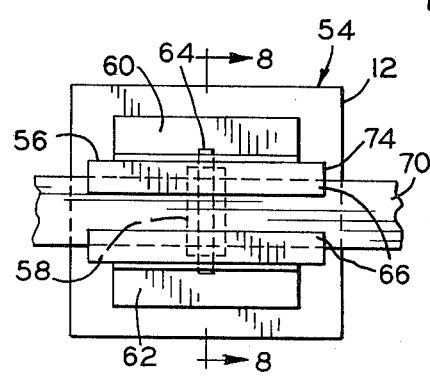
FIG. 7
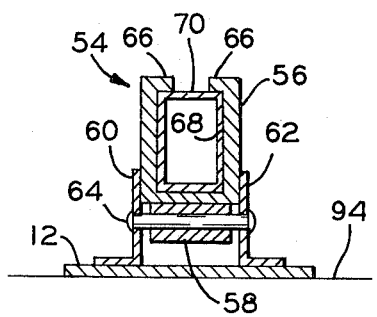
FIG. 8

VEHICLE TOWING APPARATUS

BACKGROUND OF THE INVENTION

1. Field of the Invention

The present invention relates to vehicle towing apparatus and more particularly to a towing apparatus which may be carried by a passenger car and operated in such a manner as to be connectable to the fifth wheel of a conventional tractor and operated in such a mannner as to lift the rear wheels of the passenger car off the ground so that the passenger car may be towed.

2. Description of the Prior Art

Numerous towing devices are known, for example those disclosed in U.S. Pat. Nos. 3,664,687, 3,738,684, 3,897,085, 4,113,272 and 4,149,643. In certain instances, when semi-tractors must be picked up by a driver for driving it to a destination, it is customary for a passenger car to be used for transporting the driver to the site of the tractor. Since then it is necessary to drive both the passenger car and the tractor to the destination, the services of two people are required. It would be desirable to dispense with the services of one of these.

SUMMARY OF THE INVENTION

This invention comprises a supporting frame adapted to be mounted on the rear and top of a passenger car. The frame includes an upstanding support having a horizontal cross member and an upright slot which opens through the cross member. An elongated boom is mounted in registry with the slot. First means movably engaged with the cross member supports the boom for longitudinal movement for only a first portion of its length. Such first means may be disengaged from the cross member when the boom has been moved for a distance corresponding to such first length portion. The frame further includes a guide device spaced from the upstanding support which retains the boom for both sliding and swinging movement about a horizontal axis. The guide device is adapted to be secured to the top of the car. A boom-supporting pin on the support spans the slot and carries the boom when it has been moved to release the first means from the cross member. A winch is provided on the upstanding support beneath the boom and is provided with a cable which is detachably connected to the boom intermediate its ends. With the boom extended and the distal end connected to the fifth wheel of a tractor, operation of the winch raises the rear wheel of the passenger car off the ground such that the car may be towed by the tractor.

It is an object of this invention to provide a towing apparatus which is normally carried by the vehicle to be towed and which is removably connectable to a towing vehicle.

It is another object of this invention to provide a towing apparatus which is normally carried by a passenger car and can be coupled, by one man, to the fifth-wheel of a semi-tractor so that the man who drives the passenger car to the site of a semi-tractor can drive the tractor back to a destination and tow the passenger car.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 4 is a fragmentary sectional view taken substantially along section line 4—4 of FIG. 2;

FIG. 5 is a fragmentary top view of one end portion of the apparatus;

FIG. 6 is a fragmentary side view taken substantially along section line 6—6 of FIG. 2 and of the boom-retaining device mounted on the top of a passenger car;

FIG. 7 is a top plan view of the retaining device of FIG. 6; and

FIG. 8 is a cross section taken substantially along section line 8—8 of FIG. 7.

DESCRIPTION OF THE PREFERRED EMBODIMENT

Figure 1:
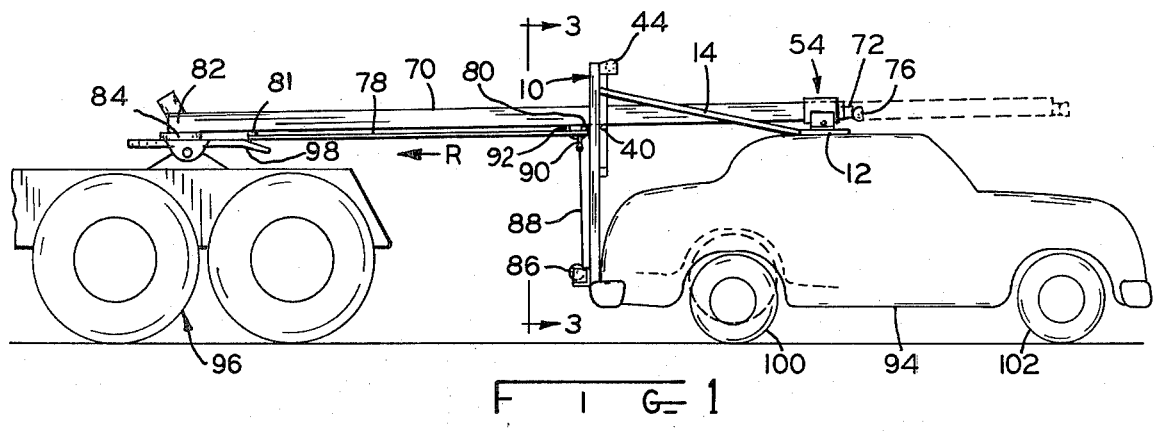
FIG. 1 is a side view of an embodiment of this invention connected to tow a passenger car.

Referring to the drawings, a rigid stationary frame formed of structural steel includes an upright support generally indicated by the numeral 10, a steel mounting plate 12 spaced forwardly thereof and two generally horizontally extending rigid struts 14 horizontally spaced, which are rigidly connected as by welding between the opposite sides of the upright support 10 and the plate 12 as shown.

Figure 3:
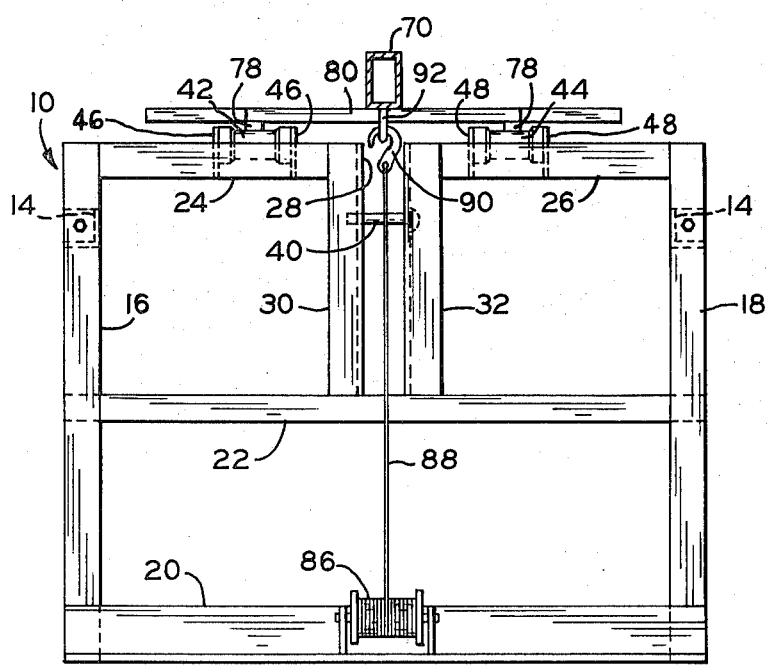
FIG. 3 is a view taken substantially along section line 3—3 of FIG. 1.

The upright support 10 is shown in more detail in FIGS. 3, 4 and 5, and is generally of rectangular shape and formed of elongted elements of structural steel suitably welded or otherwise rigidly secured together by means of threaded fasteners. A horizontal cross brace 20 is welded at its ends to the bottoms of the two uprights 16 and 18. Disposed above the cross brace 20 and also welded to the uprights 16 and 18 is another cross member 22. At the upper ends of the uprights 16 and 18 is welded yet another cross member in two sections 24 and 26 spaced apart at the inner ends to provide a slot 28. Between the inner ends of the two sections 24 and 26 and the cross member 22 are welded two horizontally spaced vertical members 30 and 32, these being spaced a distance corresponding to the width of the slot 28 to form a vertical slot extension thereof. Extending forwardly of the two vertical members 30 and 32 are two upright flanges 34 and 36, respectively, provided with horizontally aligned and vertically spaced pin-receiving holes 38. A cross pin 40 may be removably inserted into the holes 38 in spanning relation to the slot 28.

Two rollers 42 and 44 are mounted on the two sections 24 and 26 forwardly and slightly thereabove by means of brackets 46 and 48, the two brackets 46 being horizontally spaced and having a horizontal pin 50 connected thereto on which roller 42 is rotatably mounted and brackets 48 being similarly mounted and having a pin 52 which mounts rollers 44.

Securely mounted on the horizontal supporting plate 12 is a boom retaining device generally indicated by the numeral 54 as shown more clearly in FIGS. 6, 7 and 8. This device includes a slide channel 56 rectangularly shaped in cross section having a transverse bearing sleeve 58 welded to the bottom side thereof. Two angle iron side supports 60 and 62 are welded to the plate 12 to slidably receive therebetween the slide channel 56, a pivot pin 64 being welded at the ends to the upright flanges of the side supports 60 and 62 and being received by the bearing sleeve 58. The slide channel 56 is thus capable of pivotal movement about the horizontal pin 64 between the two side supports 60 and 62. As shown more clearly in FIG. 8, two inwardly directed flanges 66 are provided on the upper sides of the slide channel 56 to complete a rectangular boom-receiving guideway 68 within the channel 56.

An elongated boom 70 of rectangular cross section is slidably received within the guideway 68 and carries on the forward end an abutment or cross member 72 which is engageable with the forward end 74 of the channel 56 thereby to limit the rearward sliding movement of the boom 70 in the direction indicated by the letter "R". The abutment member 72 may also be used to mount two or more stop-lights 76.

Figure 2:
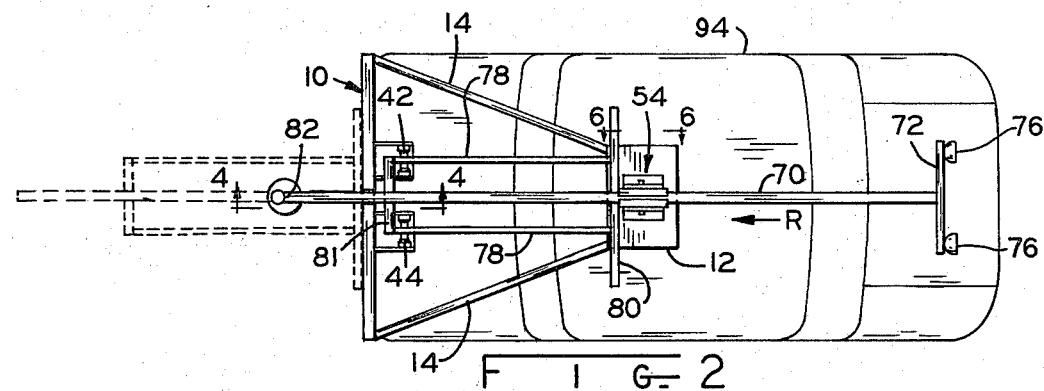
FIG. 2 is a top plan view thereof.

Two elongated support rails 78 are laterally spaced on the opposite sides of the boom 70 in parallelism therewith and are secured together at the ends thereof and to the boom 70 itself by means of front and rear cross bars 80 and 81, bar 80 being longer. As shown more clearly in FIG. 2, it will be noted that these rails 78 extend for only a portion of the length of the boom 70 and are disposed primarily on the rear length portion thereof. The rails 78 normally rest on the respective rollers 42 and 44 with the boom 70 being disposed above but in registry with the slot 28. On the rear most end 82 of the boom 70 is mounted a fifth wheel attachment 84 of conventional design. On the cross brace 20 of the upright frame portion 10 is mounted a conventional cable winch 86 having a cable 88 provided with a hook 90 which may be engaged with an eyelet 92 welded to the underside of the boom 70 as shown.

The towing apparatus of this invention is designed to be carried by a passenger car 94 of conventional design. The upright frame portion 10 is securely bolted to the rear bumper or frame of the car 94. The mounting plate 12 is rigidly secured to the roof of the car as shown, suitable bracing being provided internally of the car between the roof and the frame to carry the load of the towing apparatus (such bracing not being shown). For transporting the towing apparatus by means of the car 94, the boom 70 is retracted to the position shown in FIG. 2 wherein it substantially overlies the roof of the car. In this position, the rails 78 rest on the rollers 42 and 44 and the boom 70 is disposed above but in registry with the frame slot 28. With the boom 70 so retracted, it is in transportable position on the car 94. When a run is to be made to pick up a semi-tractor indicated generally by the numeral 96, the car 94 is driven to the site of the semi-tractor 96. The car 94 is then backed into the position shown in FIG. 1 relative to the semi-tractor 96. The boom 70 is then pulled rearwardly during which it slides within the channel 56 which serves as a guideway to maintain the boom 70 in alignment with the slot 28, the rails 78 supporting the boom for a portion of this rearward extension on the rollers 42 and 44. When the boom 70 has been pulled rearwardly a distance at which the forward most crossbar 80 passes to the rear of the frame 10, the boom drops downwardly into the slot 28 which is of a width that just clears the boom 70. The boom 70 will drop downwardly to a point at which it rests on pin 40 which may be inserted into suitable pin holes 38 to elevate the rear end 82 of the boom 70 as desired. In this position, the abutment bar 72 on the forward end of the boom 70 is engaged with the front end 74 of the slide channel 56 and the cross bar 80 engages the rear of frame 10 (FIG. 1). The car 94 is then adjusted until the attachment device 84 on the rear end of the boom 70 is disposed adjacent to the fifth wheel 98. The pin 40 at that point may be removed permitting the boom 70 to lower into position at which the attaching device 84 rests on the fifth wheel 98. The car 94 is then backed until the attachment device engages and locks into the attaching part of the fifth wheel, the cross bar 80 being in engagement with frame 10 to hold bar 70 firm during this attaching process.

The hook 90 on the winch cable 88 is now connected to the eyelet 92 on the boom 70. The winch 86 is operated to tension the cable 88 to the point at which the rear wheels 100 of the passenger car are lifted off the ground, the bar 70 engaging cross member 22 at the bottom of slot 28. The car 94 is now in position to be towed on the front wheels 102. For safety, pin 40 is inserted into a suitable opening in bar 70. The semi-tractor 96 is now driven to the destination. The winch 86 is operated to lower the passenger car wheels 100 to the ground, the hook 90 is removed from the eyelet 92 and the attachement 84 is released from the fifth wheel 98. The boom 70 is retracted toward the right as viewed in FIGS. 1 and 2 while being lifted to the point at which the rails 78 can engage the rollers 42 and 44. Continued retraction moves the boom 70 into the position shown in FIG. 2 until the forward most cross bar 80 engages the rear end of the slide channel 56. The towing apparatus is now in transportable position on the passenger car 94.

In the use of this invention, only a single person is needed in order to pickup a semi-tractor. Customarily, two persons, one a driver and the other a passenger, are transported in a passenger car to the site of the semi-tractor. One of these returns the passenger car and the other the semi-tractor. By use of the present invention, only a single person is required to drive the passenger car to the site of the semi-tractor and to return both. Thus a material savings in the cost of labor and time is realized.

While there have been described above the principles of this invention in connection with specific apparatus, it is to be clearly understood that this description is made only by way of example and not as a limitation to the scope of the invention.

What is claimed is:

1. Vehicle towing apparatus comprising a supporting frame adapted to be mounted on the rear and top of a motor vehicle, said frame including an upstanding support having a horizontal cross member and an upright boom-receiving slot which opens through said cross member, an elongated boom in registry with said slot and having a first end for selective attachment to a tractor, first means movably engaged with the cross member for supporting said boom for longitudinal movement for only a first portion of its length, said first means being disengaged from said cross member for a second portion of the length of said boom, said frame further including a retaining device spaced from said upstanding support which retains said boom for sliding and for swinging movement about a horizontal axis, and a boom-supporting element on said support which spans said slot and on which said boom may be carried, said boom being movable longitudinally for said first portion of its length until said first means disengages from said cross member whereby said second portion of said boom descends into said slot to rest on said boom-supporting element and to be confined against lateral movement by the sides of said slot, and a winch on said upstanding support beneath said boom and having a cable connectible to said boom intermediate its ends and adjacent said element.

2. The apparatus of claim 1 wherein said first means includes at least a rail secured to said boom spaced to one side and extending substantially parallel thereof, said rail having a length corresponding to said first length portion, and said rail further operatively engaging said cross member for its length.

3. The apparatus of claim 2 wherein said first means further includes a roller mounted on said upstanding support and on which said rail is carried, said boom-supporting element being a pin vertically adjustable in said slot.

4. The apparatus of claim 3 wherein said first means includes a second rail like the first and secured to said boom in like manner on the opposite side, a second roller on said support which carries said second rail.

5. The apparatus of claim 4 wherein said retaining device includes a channel member which receives said boom for longitudinal sliding movement, a pair of side supports for said channel member, and a pivot pin connected at its ends to said side supports and carrying said channel member thereon whereby said boom can be moved longitudinally in said channel member and pivoted vertically about said pivot pin.

6. The apparatus of claim 5 wherein said channel member has a sleeve secured thereto which pivotally receives said pin thereby holding said channel member against movement in a direction longitudinally of said boom.

7. The apparatus of claim 6 including a four wheeled vehicle having a top and front and rear ends, said upstanding support being mounted on said rear end and said retaining device being mounted on said top, said boom thereby being supportable by said vehicle.

8. The apparatus of claim 7 whereby said boom on the end opposite said first end carries an abutment having stopping engagement with said retaining device when said boom is moved in the direction to descend into said slot.

9. The apparatus of claim 8 including a fifth wheel attachment on the end of said boom opposite said abutment.

* * * * *